Dec. 6, 1932.  S. FRANK  1,890,252
ANTIFROST SHIELD
Filed Dec. 1, 1930
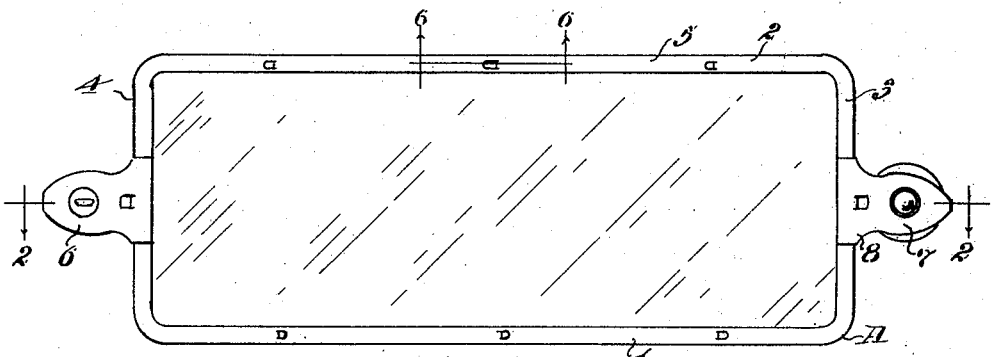
Fig. 1
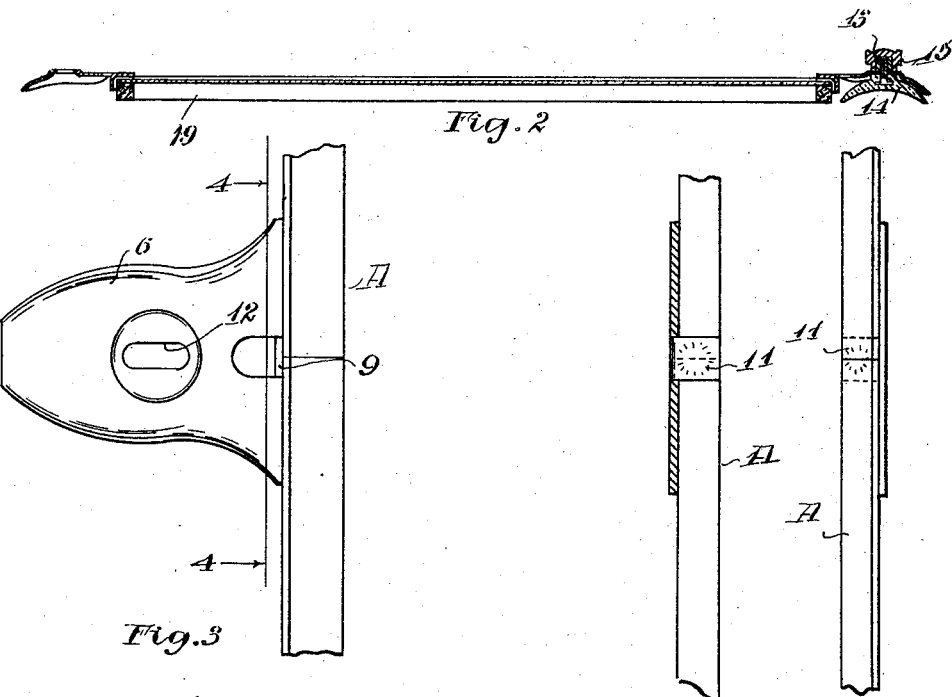
Fig. 2
Fig. 3
Fig. 4  Fig. 5
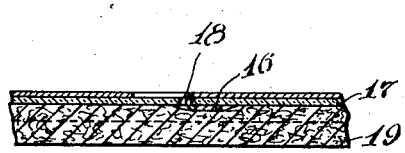
Fig. 6
INVENTOR.
Samuel Frank
BY
ATTORNEY.

Patented Dec. 6, 1932

1,890,252

UNITED STATES PATENT OFFICE

SAMUEL FRANK, OF ST. PAUL, MINNESOTA

ANTIFROST SHIELD

Application filed December 1, 1930. Serial No. 499,181.

The present invention relates to an antifrost shield for use on automobile windshields and similar purposes.

Various types of anti-frost shields for automobile windshields have been designed wherein a sheet of transparent material, such as celluloid, is held in a frame, with a sealing member around the transparent member to form a substantially air-tight enclosure, and fastening means to hold the shield on the windshield.

An object of the present invention is to make an improved and simplified anti-frost shield.

In order to attain this object, there is provided, in accordance with one feature of the invention, a two-piece angular frame with extension means mounted over the point of juncture of the two frame members, the extensions having a portion thereof which overlaps the frame members to assist in firmly holding them in position, the extensions having means for mounting vacuum cups by which the shield may be supported in a desired position on an automobile windshield or other smooth surface.

These and other features of the invention will be more fully brought out in the following description and the accompanying drawing, wherein:

Figure 1 is a view in top elevation of a windshield embodying the present invention, with one of the vacuum cups removed.

Figure 2 is a longitudinal sectional view on the line 2—2 of Figure 1.

Figure 3 is an enlarged lower view of a portion of the frame member with one of the extension members for holding the vacuum cups connected thereto.

Figure 4 is a sectional view on the line 4—4 of Figure 3.

Figure 5 is a view of Figure 3 taken from the right hand side of the structure shown in Figure 3, looking at the interior of the angular frame member; and Figure 6 is an enlarged sectional view on the line 6—6 of Figure 1.

Referring to the drawing in detail, a frame A is composed of two similar members 1 and 2 of angularly bent sheet material, the end portions 3 and 4 thereof being bent inwardly at right angles to the side portions 5. These two frame members 1 and 2, are positioned in reversed order, as shown in Figure 1, with the ends of the side portions 3 and 4 thereof in abutting relationship.

A pair of extension members 6 and 7 are constructed of sheet metal, having a planiform portion 8 of the width of the top of the frame members 1 and 2 and with a downwardly bent tab 9 of the height of the side wall of the angularly bent frame members positioned to overlie the abutting ends of the frame members. These extensions 6 and 7 are secured in position by spot welding, the downwardly bent tabs 9 to the abutting ends of the sides of the frame members as at 11, see Figures 4 and 5. The extensions are provided with a slotted opening 12 to receive the threaded shank 13 of a vacuum cup 14 which is held in position in the extension as by means of a nut 15. Prongs 16 are stamped from the metal of the top portions of the frame members and a sheet of celluloid 17, having openings 18 therein to receive these prongs, is inserted in the angular frame with the prongs 16 passing through these openings 18. The prongs 16 are then bent to lie flat against the underside of the celluloid member and to hold it in position in the frame.

A strip 19 of resilient, air resisting material, such as felt, is then secured in position below the outer edge of the celluloid and within the downwardly bent sides of the frame member to form a continuous insulating strip around the entire border of the celluloid member.

The insulating strip 19 is preferably of a thickness to be compressed somewhat by the fastening of the device to the windshield by means of the vacuum cups 14. The use of the prongs 16 to grip the celluloid member 17 in position in the frame, positively prevents displacement of this member, and the under surface of the celluloid is suitable for adhesively securing the felt strip 19, or other insulating strip in position. The downwardly bent tabs 9 of the extensions 6 and 7 rigidly hold the abutting ends of the frame members in position, and avoid the necessity of spot welding the top portion of the extensions to the frame members and thus avoids defacing of the visible surface of the extensions.

The positive fastening of the celluloid in position to the frame also assists in preventing warping of the celluloid which frequently destroys the effectiveness of a frost shield of this character. The device is simple and effective and easy to manufacture, all of which features are desirable in a frost shield of this character.

I claim:

1. An anti-frost shield, comprising a frame formed of a pair of similar, oppositely disposed strips, having their ends in abutting relation, a plurality of downwardly extending projections stamped from the material of said strips, a transparent sheet of a size to fit within said frame, said projections being bent over to engage said sheet, a pair of brackets connected to said strips at their point of abutment, said brackets having each a downwardly bent portion to overlie the joint between said strips, vacuum cup means secured to each of said brackets, and a flexible sealing strip adhesively secured around the margin of said transparent sheet below said frame.

2. A frost shield of the character described, comprising a frame formed of two strips having the end portions thereof bent inwardly, the two strips being secured together with their end portions in abutting relation, a plurality of downwardly bent tabs on each of said strips, a transparent sheet inserted in said frame, said sheet having a plurality of marginal perforations to receive said downwardly bent tabs, said tabs being bent over to hold said sheet, a strip of resilient material around the lower face of said transparent sheet, a pair of brackets mounted one over each of the abutting ends of said strips, each of said brackets having a downwardly bent tab to overlie and conceal the abutting ends of said strips, and vacuum cup means connected to each of said brackets.

3. An anti-frost shield having a frame formed of two strips of angle metal having inwardly bent end portions, the ends of said strips being secured in oppositely disposed abutting relation to each other, a transparent sheet secured in said frame, a resilient sealing strip positioned marginally around said transparent sheet, a pair of brackets secured one over each abutting joint between said frame members, each of said brackets having a downwardly bent tab overlying and secured to the abutting frame portions, and vacuum cup means secured to each of said brackets.

4. An anti-frost shield, comprising a frame formed of a pair of oppositely disposed angle metal strips having inwardly bent end portions having their ends in abutting relation, a plurality of downwardly bent tabs formed on each of said strips, a sheet of transparent material mounted in said frame and having a plurality of perforations to receive said tabs, said tabs being bent to grip said sheet to secure it to said frame, a strip of resilient material secured about the margin of said transparent sheet, a pair of brackets mounted one over each abutting joint between said frame strips, and vacuum cup means mounted in each of said brackets.

5. An anti-frost shield, comprising a frame formed of two strips of angle metal having the end portions thereof bent inwardly, the end portions of opposite strips being in abutting relation with each other, a transparent sheet inserted in said frame, a strip of resilient material secured around the margin of said transparent sheet, a pair of brackets mounted one over each abutting joint between said strips, a tab formed on each of said brackets, being bent downwardly to overlie and conceal the joint between said strips, and vacuum cup means secured to each of said brackets.

6. An anti-frost shield comprising a frame formed of a pair of angle metal strips having their end portions bent inwardly, the end portions of opposite strips being in abutting relation with each other, tabs cut from the metal of said strips and bent downwardly, a sheet of transparent material having marginal perforations adapted to receive said tabs and to be secured in position in said frame by the bending of said tabs to underlie the under surface of said transparent sheet, a strip of resilient sealing material mounted below said transparent sheet to seal said perforations and to extend downwardly below said angular metal strips, and a pair of brackets mounted one on each end of said frame to overlie the abutting joint between said strips, a tab cut from the metal of said brackets and bent downwardly to overlie the abutting joint between said strips to conceal said joint, and vacuum cup means secured to each of said brackets.

7. An anti-frost shield, comprising a frame formed of sheet metal, and having a plurality of downwardly bent tabs formed thereon, a transparent sheet having a plurality of perforations to receive said tabs, said tabs being bent to grip said sheet to secure it to said frame, a sealing strip of resilient material secured around the margin of said transparent sheet beneath said metal frame, and mounting means carried by said frame to mount said frame on a supporting surface.

8. An anti-frost shield, comprising a frame formed of sheet metal, and having a plurality of downwardly bent tabs formed thereon, a transparent sheet having a plurality of perforations to receive said tabs, said tabs being bent to grip said sheet to secure it to said frame, a sealing strip of resilient material secured around the margin of said transparent sheet beneath said metal frame, a mounting bracket mounted on each end of said frame to project therefrom, and a suction cup carried by each of said brackets and adapted to engage a planiform surface on which the device is to be mounted to hold said resilient sealing strip in engagement with said mounting surface.

In testimony whereof I affix my signature.

SAMUEL FRANK.